Figure 1:
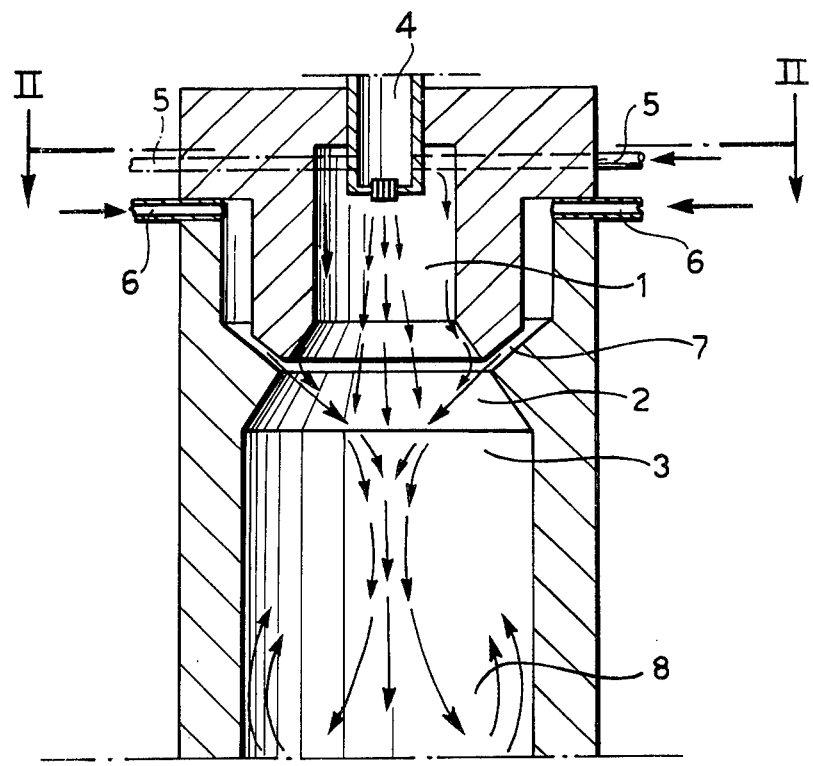

---

United States Patent [19]

Piccolo et al.

[11] 4,021,533

[45] May 3, 1977

[54] MANUFACTURE OF TITANIUM DIOXIDE BY THE SULPHATE PROCESS USING NUCLEI FORMED BY STEAM HYDROLYSIS OF TICL₄

[75] Inventors: Luigi Piccolo, Milan; Marcello Ghirga, Bresso (Milan); Antonio Paolinelli, Milan, all of Italy

[73] Assignee: Societa' Italiana Resine S.I.R. S.p.A., Milan, Italy

[22] Filed: Sept. 29, 1975

[21] Appl. No.: 617,954

[30] Foreign Application Priority Data

Oct. 4, 1974 Italy .................................. 28050/74

[52] U.S. Cl. .............................. 423/610; 423/612; 423/615; 423/462
[51] Int. Cl.² ........................................ C01G 23/04
[58] Field of Search ............ 423/85, 462, 608, 612, 423/613, 615, 610

[56] References Cited

UNITED STATES PATENTS

| 1,931,380 | 10/1933 | Haber et al. ...................... 423/613 |
| 1,967,235 | 7/1934 | Ferkel ................................ 423/613 |
| 3,253,889 | 5/1966 | Wildt et al. ........................ 423/613 |
| 3,310,377 | 3/1967 | Stern et al. ........................ 423/613 |
| 3,481,703 | 12/1969 | Zirngibl ............................. 423/613 |
| 3,862,297 | 1/1975 | Claridge et al. .................. 423/615 |

*Primary Examiner*—Earl C. Thomas
*Assistant Examiner*—Brian E. Hearn
*Attorney, Agent, or Firm*—Christie, Parker & Hale

[57] ABSTRACT

A solution of active nuclei for the hydrolysis of titanium sulphate and for the rutilisation of titanium dioxide in the manufacture of titanium dioxide in tutile form in the method via sulphate is prepared by transforming titanium tetrachloride into a compound of the formula $Ti(OH)_xCl_y$, wherein $x$ ranges from 1 to 3, $y$ from 3 to 1 and $x+y$ is equal to 4 by contact with steam in the vapor phase, and contacting the reaction products with an aqueous solution of sodium hydroxide to form an aqueous suspension of titanium hydroxide having a $TiO_2$ content of from 10 to 30 grams/liter and a pH value of from 3 to 4.

10 Claims, 2 Drawing Figures

MANUFACTURE OF TITANIUM DIOXIDE BY THE SULPHATE PROCESS USING NUCLEI FORMED BY STEAM HYDROLYSIS OF TICL₄

This invention concerns improvements in the manufacture of titanium dioxide from titaniferous materials and sulphuric acid. Titanium dioxide is produced widely an a commercial scale by the method known as the "sulphate process", according to which a titaniferous material, such as ilmenite or a titaniferous slag, is reacted at fairly high temperatures with concentrated sulphuric acid so as to form a porous solid mass consisting of ferrous and ferric sulphates, of titanium sulphate and of small quantities of unattacked material, consisting mostly of silica and alumina, and also, though only in a small amount, of sulphates of magnesium, chromium, manganese, vanadium and other element.

The solid porous mass is then dissolved in water or in water acidified with sulphuric acid to form a sulphate solution, and the ferric sulphate present in this solution is transformed into ferrous sulphate by addition to the solution of a reducing agent, normally iron in the form of powder, filings or scrap.

The resulting solution is clarified by treatment with flocculants and subsequent filtration so as to remove undissolved and suspended impurities.

The ferrous sulphate present is then for the most part removed by precipitation in its heptahydrate form ($FeSO_4 \cdot 7 H_2O$) through cooling of the solution and subsequent filtration or centrifuging.

The residual solution, after concentration, is hydrolised, usually by dilution with water at elevated temperature, using the self-nucleation or induced nucleation method, to transform the soluble titanium sulphate into insoluble titanium hydroxide.

After precipitation of the hydroxide the latter is filtered, washed, supplied with suitable additives and calcined so as to yield the titanium dioxide from which the finished product is obtained by means of milling and possible after-treatment.

The behaviour of titanium dioxide in its use as a pigment, especially its characteristics of hiding power and of dispersion, is known to depend mainly upon the properties of the elementary granules of said titanium dioxide and more exactly upon the average diameter, granulometric dispersion, and the form and degree of subdivision in single granules.

The average diameter of the elementary granules of titanium dioxide is one of the factors which determines the field of application of the pigment: for example, in painting it is preferable to use granules with an average diameter around 0.22 micron, whilst granules having an average diameter around 0.19 micron are preferable for dispersion in resin.

Granulometric dispersion must be as little as possible: generally, for use as pigments, the best results are achieved with elementary granules having a diameter of from 0.15 to 0.30 micron. Moreover, the particles have to be compact, without sharp or otherwise uneven projections, and preferably rounded in shape. The degree of subdivision preferred is that in which granule aggregates are absent or at least greatly reduced.

It is known that in sulphate processes for the manufacture of titanium dioxide the conditions under which the hydrolysis stage is effected exert a very great influence upon the properties of the elementary granules of said titanium dioxide.

Especially, in order to control the average diameter of the titanium dioxide granules, recourse is usually made to the presence of small particles of titanium hydroxide in the hydrolysis medium, which behave as nuclei during precipitation of the titanium hydroxide formed in the hydrolysis of titanium sulphate.

The presence of these nuclei may be due to their formation directly in loco (autonucleation method) or else to the introduction into the hydrolysis medium of measured quantities of nuclei manufactured separately (induced nucleation method).

According to the auto-nucleation method, generally the nuclei are formed upon first contact of the solution of titanium sulphate with the dilution water added for hydrolysis.

According to the induced nucleation method, on the other hand, the hydrolysis nuclei can be prepared from the said sulphuric titaniferous solution to be hydrolised, by neutralisation with alkaline solutions, or else from aqueous solutions of titanium tetrachloride by hydrolysis of same.

Neither of the two systems possesses such advantages as to supplant the other, and in the present state of the art both systems are used without any sensible difference in results.

In general, a large quantity of nuclei gives rise to the formation of a final product of fine granulation, whilst a small quantity of nuclei gives rise to the formation of a product of coarser granulation.

These methods, though on the hand they allow regulation of the average diameter of the granules of the final titanium dioxide, also have, however numerous disadvantages which are of not inconsiderable importance in the applications of titanium dioxide as a pigment.

Particularly, the granulation dispersion parameter will often be very wide; moreover the degree of subdivision is not very high through the presence of numerous aggregates, whilst the particles are very uneven in shape and seldom rounded.

Now a new method has been found for the preparation of nuclei of hydrolysis of titanium sulphate, which allow the obtainment of surprisingly better results in the properties of the elementary granules of titanium dioxide when the said nuclei are used in the hydrolysis stage of the sulphate process.

Moreover the hydrolysis nuclei obtained by the process of this invention promote, in the said sulphate process, the conversion of the final titanium dioxide from the anatase form to the rutile form especially in the calcination stage which is usually carried out at temperatures around 900° C.

The process of this invention consist essentially of:
transforming, in a first stage, titanium tetrachloride into a compound of the general formula $Ti(OH)_x Cl_y$ where $x$ ranges from 1 to 3 and $y$ from 3 to 1, and $x + y$ is always equal to 4, by contacting in the vapour phase titanium tetrachloride with steam, in a molar ratio of titanium tetrachloride to steam of from 1:1 to 1:3, at a temperature of from 400 to 800° C and for a period of from 0.1 to 30 seconds;
placing in contact, in a second stage, the reaction products of the first stage with an aqueous solution of sodium hydroxide in such an amount as to separate an aqueous suspension of titanium hydroxide, with a titanium content, expressed as $TiO_2$, of from 10 to 30 grams/liter and a pH value of from 3 to 4.

This suspension, with the titanium content and pH indicated above, is used directly in the hydrolysis of titanium sulphate, the said suspension containing the nuclei for the said hydrolysis and for rutilisation of the final titanium dioxide.

In one embodiment of the process of this invention, the reaction products of the first stage are subjected to stripping through contact with a portion of the aqueous suspension obtained in the second stage, which is recycled after addition of the quantity of sodium hydroxide solution necessary for setting the final pH within the above mentioned range of values.

It is preferable to effect a rapid cooling of the reaction products of the first stage to a final suspension temperature less than 80° C.

This rapid cooling is achieved according to this invention by contact with the solution or recycle suspension kept at a temperature such as to obtain the desired results.

According to a preferred embodiment of the process of this invention the first stage is carried out with a molar ratio of titanium tetrachloride to steam equal to about 1:2, at a temperature of from 550° to 650° C and for a period of from 0.5 to 4 seconds.

Even more preferably, the said first stage can be effected by contacting, in a suitable apparatus, a gasous flow consisting of titanium tetrachloride and steam with a flow of hot gases obtained by combustion of an auxiliary fuel.

One can use, with advantage, an equipment similar to that described for the preparation of titanium sulphate "via chloride" in Italian Pat. No. 869,574, which is illustrated in the accompanying drawings.

This apparatus consists essentially of a reaction chamber comprising an upper zone of cylindrical form (combustion zone) and a lower zone also cylindrical in form but of larger diameter than the upper one (reaction zone), the two zones being connected by an intermediate zone in the form of a truncated cone which defines the mixing zone.

In the combustion zone there occurs, essentially, combustion of the auxiliary fuel.

In the mixing zone there is mixing of the gaseous flow comprising titanium tetrachloride and steam with the flow formed by the hot gases obtained by combustion of the auxiliary fuel.

Figure 2:
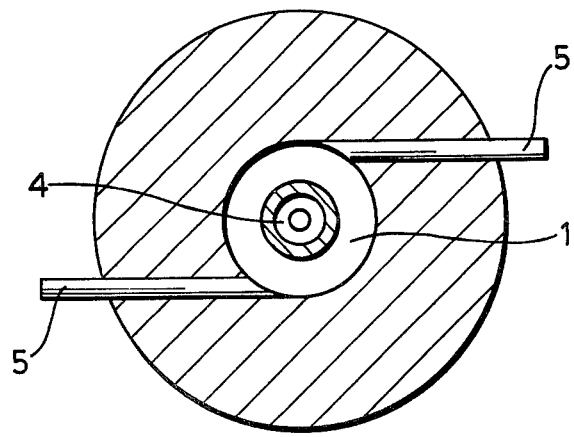

In the reaction zone there occurs the change of titanium tetrachloride to the compound of the general formula $Ti(OH)_x Cl_y$. More details are illustrated in the accompanying drawings, wherein:

FIG. 1 is an axial cross-sectional view of a reaction chamber comprising a combustion zone 1, a mixing zone 2 and a reaction zone 3, and FIG. 2 is a transverse cross-sectional view on line II—II of FIG. 1.

Particularly, in the upper part of the combustion zone 1 there is placed the burner 4 for combustion of the auxiliary fuel.

The combustion zone 1 is cylindrical in form and of such height as to use up the flame almost completely before its contact with the titanium tetrachloride. It is convenient to use burners of the premix type since with these it is possible to obtain relatively short flames. As fuels one can use carbon monoxide, hydrogen, methane, acetylene, liquified petroleum gas.

Methods of operation also are basically those illustrated in the Italian Patent referred to. Therefore, titanium tetrachloride is fed in the form of an annular thin sheet of gas with a tilt of 30 to 60° in relation to the axis of the reaction chamber which corresponds to the direction of the central flow of hot gases produced in burning of the auxiliary fuel.

With reference to FIG. 1, the titanium tetrachloride fed via 6 is conveyed into the mixing zone 2 through the annular slit 7 made in the wall of the frustoconical zone, the said slit being placed in a roughly normal position in relation to the said wall.

Particularly, the tilt of the said wall in relation to the axis of the reaction chamber is so adjusted as to have the desired angle of impact between the flow of titanium tetrachloride and that of the hot combustion gases.

The steam on the other hand is fed tangentially to the wall of the upper portion of the combustion zone.

Referring to FIG. 1, the steam is fed through two pipes 5 and this detail is made clear in FIG. 2.

The current of steam remains close to the wall until it reaches the zone in which it mixes with the titanium tetrachloride.

The flow rates of titanium tetrachloride and of steam are so adjusted that the molar ratio of titanium tetrachloride to steam and the residence time in the reaction zone shall be within the ranges previously specified.

Burning of the auxiliary fuel, on the other hand, is so adjusted as to have the desired temperature, in practice by adjusting the feed fuel titanium tetrachloride ratio.

The equipment and working conditions described allow the establishment of a fluodynamic system which ensures for all the particles of $Ti(OH)_x Cl_y$ equal conditions of formation, of growth, of residence at high temperature and subsequently of chilling.

Particularly, the equipment described ensures a speedy mixing of the titanium tetrachloride with the steam, followed by an equally speedy homogenisation of the reagents with the hot gases produced in the burning of the auxiliary fuel.

Particularly, this latter factor allows the reaction to be completed in a short section of the reaction zone proper, in any case in a section in which the recirculation of reaction products is sufficiently low.

This recirculation develops in the that part of the reaction zone which is at a distance from the mixing zone equal to two to three times the diameter of the reactor and which is shown by in FIG. 1.

The reaction being completed in a brief reactor section, contact is therefore eliminated of the non-reacted titanium tetrachloride with the recirculation material, and consequently reaction is also prevented fom occurring upon the surface of the particles of $Ti(OH)_x Cl_y$ already formed.

By this means, one has neither the formation of $Ti(OH)_x Cl_y$ particles of undesired dimensions, nor the formation of particle agglomerates, because of the uniform reaction conditions ensuring to all particles the same formation conditions.

The reaction products of the first stage, consisting of $Ti(OH)_x Cl_y$ particles, hydrochloric acid, combustion gases and small amounts of air and oxygen, are then put into contact with the solution or recycle suspension as previously described so as to achieve the second stage of the process in this invention.

As aqueous solutions of sodium hydroxide there can advantageously be used those having a concentration of from 20 to 60 grams/liter of preferably those with a concentration around 40 grams/liter.

Whilst the combustion gases, the air and the oxygen are cleaned out, a portion of the aqueous suspension obtained is recycled and used, after the addition of the necessary aqueous solution of sodium hydroxide, for stripping. The reaction products of the first stage, and the remaining portion is sent to the medium where titanium sulphate is hydrolised to form titanium hydroxide, the said suspension containing the nuclei for the said induced nucleation hydrolysis and for rutilisation of the final titanium dioxide.

In fact by using, in the induced nucleation hydrolysis of titanium sulphate conducted according to one of the known systems in the sulphate process, the nuclei contained in the suspension of this invention in an amount of from 0.5 to 5% in weight of titanium expressed as $TiO_2$ in relation to the titanium expressed as $TiO_2$ present in the solution of titanium sulphate, there is obtained a finely subdivided hydroxide which, calcined according to the known art, gives rise to a product of decidedly superior characteristics compared with the products obtained by using hydrolysis nuclei prepared according to conventional systems.

In particular, by using nuclei according to this invention there are obtained particles of final titanium dioxide, in rutile form, characterised, apart form their regular average diameter, also by a regular and rounded form, by the lack of bundling and aggregations, and consequently by a very high degree of subdivision, and also by a granulation dispersion parameter which lies in a very restricted range.

Consequently the application characteristics of the final titanium dioxide as a pgiment are decidely improved.

In practice, the granules of final titanium dioxide show a Reynolds reducing power (measure of the covering power described in GARDNER-SWARD Physical and Chemical Examination - Paints, Varnishes, Lacquers, Colours - 12th Edition (1962) pp. 53–54), which can reach about 2000, and is typically around about 1950, against the value of about 1800 usually reached by using, in hydrolysis, nuclei produced according to conventional systems.

On the other hand, the dispersion (measured by the Hegman gauge according to the method described in GARDNER-SWARD - Physical and Chemical Examination —Paints, Varnishes, Lacquers, Colours 12th Edition 1962 p.243), after 5 hours of grinding in a ball mill in a vehicle consisting of a glycerophthalic alkyd resin, e.g. that known by the trade name of SIRAL-CHID 2256 of the Societa Italiana Resine S.I.R., will be round about 6.9 against the value of about 5.8 usually reached by using conventional nuclei in the hydrolysis.

The suspension obtained according to this invention can also be used with advantage solely as a rutilation agent, by adding it to the hydroxide obtained by hydrolysis of the titanium sulphate by the autonucleation method, e.g. the Blumenfeld method, again giving rise to a final titanium dioxide of noticeably improved application characteristics. The amounts of suspension used for the purpose are still substantially those indicated above for induced nucleation hydrolysis.

The invention will now be further illustrated by the following Examples, which however are not intended to restrict it in any way. In the Examples, the parts are intended by weight.

EXAMPLE 1

Preparation of nuclei was carried out according to the invention in a reactor similar to that described in Italian Pat. No. 869,574 and shown in FIGS. 1 and 2, with a cylindrical reaction zone 3 having a diameter of 16 cm and a height of 50 cm.

From the auxiliary burner 4 there were fed 0.6 $Nm^3/h$ of co and 0.33 $Nm^3/h$ of $o_2$ thus to produce $CO_2$ at high temperature. At the same time vaporised $TiCl_4$ fed from 6 at a temperature of 150° C and at a rate of 18 Kg/h and steam superheated to 150° C fed from 5 at a rate of 5.25 $nm^3/h$ were mixed with the products of combustion of the auxiliary burner in 2, $TiCl_4$ being transformed into the required nuclei, in the gaseous phase.

The reaction fumes were rapidly cooled immediately downstream of the reactor, the residence time in the hot reaction zone, at a temperature averaging 600° C, being of 2–3 seconds.

Cooling was carried out by means of spraying of the fumes with the said final aqueous suspension of the nuclei, suitably recycled.

The said suspension was kept at a temperature of from 55° to 65° C by means of an appropriate heat exchanger. Together with said aqueous suspension, there was sprayed a solution of NaOH at about 40 g/1 so as to obtain a resulting suspension at a pH value around 3.5 and a nuclei concentration, expressed as $TiO_2$, equal to 20 g/1.

To a solution of titanium sulphate resulting from ilmenite attack, submitted to the conventional treatment for removing the most part of the iron, filtered and concentrated up to a content of 240 g/1 of titanium expressed as $TiO_2$, having an acid factor (ratio in weight of active acidity to titanium expressed as titanium dioxide, where by active acidity is meant the sum of free acid plus the acid linked to the titanium as titanium sulphate) equal to 1.8, there was added a solution of nuclei prepared as above in a quantity equivalent to 1 part of $TiO_2$ in suspension per 100 parts of $TiO_2$ in the solution.

the solution thus treated was boiled for 2 hours under reflux, and was then diluted to 170 g/1 of $TiO_2$ by means of the gradual addition of water within a period of 30 minutes, the solution being kept all the time on the boil, and finally, dilution being completed, the solution was boiled for another 20 minutes so as to obtain a high yield of hydrolysis. The yield was found equal to 96.5% by analytical determination.

As a test for determining the subdivision of the particles obtained in the hydrolysis, the sedimentation rate was measured: 100 ml of slurry resulting from hydrolysis were added to 900 ml of water in a graduated cylinder 35 cm high, and left to settle for 30 minutes.

The smaller the average dimensions of the aggregates of particles of titanium dioxide, the lower is the sedimentation rate.

In this Example, a rate of sedimentation of 3.5 cm in 30 minutes was obtained.

The slurry was filtered and the hydroxide was calcined in the presence of zinc sulphate added in an amount corresponding to 1.5 parts of ZnO for 100 parts of $TiO_2$, at 900° C for 3 hours. The calcined product was then wet ground in a ball mill for 5 hours and post-treated according to the conventional art with sodium silicate and aluminium sulphate in amounts corresponding to 0.6 part of $S1O_2$ and 2.5 parts of $Al_2O_3$ for 100 parts of $TiO_2$. The product was finally ground in a jet-mill.

The product thus obtained had the following characteristics:

Reynolds reducing power: 1950, average diamer of the particles: 0.22 micron, dispersion parameter: 0.38 (defined as $(d_{75} - d_{25})/d_{50}$ wherein by $d_{75}$ is meant the diamer below which lies 75% of the particles etc.), dispersion determined by the Hegman gauge after 5 hours of grinding in a glycerophthalic alkyl resin SI-RALCHID 2256 in a ball mill: 6.9. Under electron microscope examination, 80% of the particles were rounded in form and there was practically no aggregates.

EXAMPLE 2 (comparative)

A suspension of nuclei was prepared from an aqueous solution of titanium tetrachloride according to the conventional discontinuous process. To a solution of titanium tetrachloride containing 60 g/l of $TiO_2$ there was added a solution of sodium hydroxide, keeping the mixture at 60 –65° C for 20 minutes and obtaining a suspension of nuclei with a $TiO_2$ content equal to 20 g/l and a pH equal to 3.5.

To a solution of titanium sulphate similar to that of Example 1, there was added the suspension of nuclei in an amount corresponding to 1 part of $TiO_2$ in suspension per 100 parts of $TiO_2$ in solution.

Then hydrolysis was carried out under conditions described in Example 1.

The test for determining the average dimensions of the hydroxide of titanium showed a speed of sedimentation equal to 8 cm in 30 minutes, thus indicating the obtaining of a granulometric product which is noticeably larger than in Example 1, even if still valid as a pigment, since the limit velocity is of 10 cm in 30 minutes.

Calcination and after-treatment were the carried out as in Example 1.

The product had the following characteristics:

Reynolds reducing power: 1825, average diameter of the particles: 0.23 micron, dispersion parameter: 0.49, dispersion: 5.8. Under electron microscope examination the particles were more irregular in form than in Example 1, only 50% were rounded in form, and frequent aggregates were noted.

EXAMPLE 3

A solution of titanium sulphate having the characteristics described in Esample 1 was hydrolised according to the autonucleation method described by Blumenfeld (see Jelks Barksdale - Titanium - Sec.Ed. 1966 pp.294 –297).

A portion of the solution to be hydrolised, heated to 95° C, was fed at constant speed for 16 minutes into a quantity of water, heated to 91° C, equal to ¼ of its volume. The mixture was then heated rapidly up to 102° C and then slowly up to boiling, and it was kept boiling for 5 hours. With the purpose of increasing the hydrolysis yield, a further amount of water was added at 95° C, equal in volume to 1/10 of the initial volume of the solution, and boiling was continued for 1 hour. Thus, there was obtained a hydrolysis yield equal to 96%.

After filtration and washing, bleaching was carried out, operating according to the conventional art with Zn powder on a slurry at 300 g/1 of $TiO_2$ acidified with sulphuric acid.

To this slurry, there was added at 60° C the suspension of nuclei prepared as described in Example 1, in an amount corresponding to 1 part of $TiO_2$ in suspension per 100 parts of $TiO_2$ in the slurry.

Filtration, washing with demineralised water and addition as additive for the rutile pigment of $ZnSO_4$ in an amount corresponding to 1.5 parts of ZnO per 100 parts of $TiO_2$, were then carried out.

The product was calcined at a temperature of 900° C for 3 hours and cooled slowly to 700° C out of contact with air and then more rapidly in air.

The calcined product was ground and after-treated as in the previous Examples.

The product obtained in rutile form had the following characteristics: reducing power 1875, average diameter of particles 0.21 micron, dispersion parameter 0.45, dispersion 6.5.

Under electron microscope examination, the greater part of the particles (65%) were rounded in form and there was bu few aggregates.

EXAMPLE 4 (comparative)

Example 3 was repeated, using as nuclei suspension that obtained according to the conventional method described in Example 2.

The pigment finally obtained had the following characteristics: Reynolds reducing power: 1775, average particle diameter: 0.22 micron, dispersion parameter: 0.49 and dispersion: 5.8.

This product in rutile form was more aggregated with more irregular particles (less than 50% were rounded) than that obtained in Example 3 by using as nucleant suspension that obtained according to the process of this invention.

We claim:

1. A process for preparing active nuclei for the hydrolysis of titanium sulphate and for the rutilisation of titanium dioxide in the manufacture of titanium dioxide in rutile form by a sulphate process, which comprises:
   a. transforming, in a first stage, titanium tetrachloride into a compound of the general formula Ti-$(OH)_xCl_y$, where $x$ ranges from 1 to 3, $y$ from 3 to 1 and $x+y$ is equal to 4, by contacting in the vapor phase titanium tetrachloride with steam in a molar ratio of titanium tetrachloride to steam of from 1:1 to 1:3, at Serial No. 617,954 a temperature of from 400° to 800° C for a period of from 0.1 to 30 seconds;
   b. placing into contact, in a second stage, the reaction products of the first stage with an aqueous solution of sodium hydroxide in such an amount as to separate an aqueous suspension containing titanium hydroxide with a titanium content, expressed as $TiO_2$, of from 10 to 30 grams/liter and having a pH value of from 3 to 4.

2. The process of claim 1, wherein said aqueous solution of sodium hydroxide has a content in sodium hydroxide of from 20 to 60 g/liter.

3. The process of claim 2, wherein said content is of about 40 g/liter.

4. The process of claim 1, which additionally comprises stripping the reaction products of the first stage by contacting said reaction products with said aqueous solution of sodium hydroxide mixed with a recycled portion of the aqueous suspension obtained at the second stage 5. The process of claim 4, wherein said reaction products of the first stage are cooled rapidly by contact with said aqueous solution, thus to obtain a temperature less than 80° C for the aqueous suspension.

6. The process of claim 1, wherein said first stage is carried out by contacting said titanium tetrachloride together with said steam with a flow of hot gases obtained by combustion of an auxiliary fuel.

7. In a process for the manufacture of titanium dioxide in rutile form by a sulphate process, wherein a titanium sulphate solution is hydrolyzed to transform the soluble titanium sulphate into insoluble titanium hydroxide and said titanium hydroxide is converted into titanium dioxide in rutile form by calcination, the improvement which comprises adding to the solution to be hydrolyzed an aqueous suspension of titanium hydroxide prepared by the steps comprising:

a. transforming, in a first stage, titanium tetrachloride into a compound of the general formula $Ti(OH)_xCl_y$, where $x$ ranges from 1 to 3, $y$ from 3 to 1 and $x+y$ is equal to 4, by contacting the vapor phase titanium tetrachloride with steam in a molar ratio of titanium tetrachloride to steam of from 1:1 to 1:3, at a temperature of from 400° to 800° C for a period of from 0.1 to 30 seconds; and b. placing into contact, in a second stage, the reaction products of the first stage with an aqueous solution of sodium hydroxide in such an amount as to separate an aqueous suspension containing titanium hydroxide with a titanium content, expressed as $TiO_2$, of from 10 to 30 grams/liter and having a pH value of from 3 to 4, in a quantity ensuring the addition of from 0.5 to 5 parts by weight of titanium, expressed as $TiO_2$, in said suspension per 100 parts by weight of titanium expressed as $TiO_2$ present in the titanium sulphate solution.

8. In a process for the manufacture of titanium dioxide in rutile form by a sulphate process, wherein a titanium sulphate solution is hydrolyzed to transform the soluble titanium sulphate into insoluble titanium hydroxide and said titanium hydroxide is converted into titanium dioxide in rutile form by calcination, the improvement which comprises adding to the hydrolyzed product obtained by hydrolysis of said titanium sulphate without introduction of hydrolysis nuclei, an aqueous suspension of titanium hydroxide prepared by the steps comprising:

a. transforming, in a first stage, titanium tetrachloride into a compound of the general formula $Ti(OH)_xCl_y$, where $x$ ranges from 1 to 3, $y$ from 3 to 1 and $x+y$ is equal to 4, by contacting the vapor phase titanium tetrachloride with steam in a molar ratio of titanium tetrachloride to steam of from 1:1 to 1:3, at a temperature of from 400° to 800° C for a period of from 0.1 to 30 seconds; and b. placing into contact, in a second stage, the reaction products of the first stage with an aqueous solution of sodium hydroxide in such an amount as to separate an aqueous suspension containing titanium hydroxide with a titanium content, expressed as $TiO_2$, of from 10 to 30 grams/liter and having a pH value of from 3 to 4, in a quantity ensuring the addition of from 0.5 to 5 parts by weight of titanium, expressed as $TiO_2$, in said suspension per 100 parts by weight of titanium, expressed as $TiO_2$, present in the titanium sulphate solution.

9. A process for preparing active nuclei for the hydrolysis of titanium sulphate and for the rutillisation of titanium dioxide in the manufacture of titanium dioxide in rutile form by a sulphate process which comprises:

a. transforming, in a first stage, titanium tetrachloride into a compound of the general formula $Ti(OH)_xCl_y$, where $x$ ranges from 1 to 3, $y$ from 3 to 1 and $x+y$ is equal to 4, by contacting in the vapor phase titanium tetrachloride with steam in a molar ratio of titanium tetrachloride to steam of about 1:2 at a temperature of from 550° to 650° C for a period of from 0.5 to 5 seconds; and b. placing into contact, in a second stage, the reaction products of the first stage with an aqueous solution of sodium hydroxide in such an amount as to separate an aqueous suspension containing titanium hydroxide with a titanium content, expressed as $TiO_2$, of from 10 to 30 grams/liter and having a pH value of from 3 to 4.

10. A process for preparing active nuclei for the hydrolysis of titanium sulphate and for the rutilisation of titanium dioxide in the manufacture of titanium dioxide in rutile form by a sulphate process which comprises:

a. transforming, in a first stage, titanium tetrachloride into a compound of the general formula $Ti(OH)_xCl_y$, where $x$ ranges from 1 to 3, $y$ from 3 to 1 and $x+y$ is equal to 4, by contacting in the vapor phase titanium tetrachloride with steam in a molar ratio of titanium tetrachloride to steam of 1:1 to 1:3 at a temperature of from 550° to 650° C for a period of from 0.1 to 30 seconds; and b. placing into contact, in a second stage, the reaction products of the first stage with an aqueous solution of sodium hydroxide in such an amount as to separate an aqueous suspension containing titanium hydroxide with a titanium content, expressed as $TiO_2$, of from 10 to 30 grams/liter and having a pH value of from 3 to 4.

* * * * *

UNITED STATES PATENT AND TRADEMARK OFFICE
CERTIFICATE OF CORRECTION

PATENT NO. : 4,021,533
DATED : May 3, 1977
INVENTOR(S) : Luigi Piccoto, Marcello Ghirga, Antonio Paolinelli It is certified that error appears in the above-identified patent and that said Letters Patent are hereby corrected as shown below:

Column 1, line 18, "element" should read --elements--.

Column 2, line 30, after "the" insert --one--.

Column 4, line 44, after "in" delete --the--.

Column 7, line 38, "the" should read --then--.

Column 7, line 50, "Esample" should read --Example--.

Column 8, line 20, "bu" should read --but--.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*